United States Patent

[11] 3,607,893

| [72] | Inventors | Gerald H. Reifenberg<br>Hightstown;<br>William J. Considine, Somerset, both of N.J. |
|---|---|---|
| [21] | Appl. No. | 784,879 |
| [22] | Filed | Dec. 18, 1968 |
| [45] | Patented | Sept. 21, 1971 |
| [73] | Assignee | M&T Chemicals Inc.<br>New York, N.Y. |

[54] ADDITION OF TRIHALOSTANNOUS ACID TO OLEFINS
8 Claims, No Drawings

| [52] | U.S. Cl. | 260/429.7 |
|---|---|---|
| [51] | Int. Cl. | C07f 7/22 |
| [50] | Field of Search | 260/429.7 |

[56] References Cited
UNITED STATES PATENTS 3,398,169  8/1968  Newmann et al. ............ 260/429.7

*Primary Examiner*—Tobias E. Levow
*Assistant Examiner*—Werten F. W. Bellamy
*Attorneys*—Lewis C. Brown, Kenneth G. Wheeless and Robert P. Grindle ABSTRACT: This invention comprises a method for producing organotin trihalides comprising reacting as reactants trihalostannous acid, $HSnX_3$, wherein X is halogen, in an ethereal solution, and a compound selected from the group consisting of α-olefinic compounds and cycoolefinic compounds and recovering said organotin trihalide compounds.

ADDITION OF TRIHALOSTANNOUS ACID TO OLEFINS

This invention relates to a novel process for the manufacture of organotin trihalide compounds.

This invention for the production of organotin trihalides comprises reacting as reactants trihalostannous acid, $HSnX_3$, wherein X is halogen, in an ethereal solution, and a compound selected from the group consisting of α-olefinic compounds and cycloolefinic compounds and recovering said organotin trihalide compounds.

According to another of its aspects, the method of this invention for the production of organotin trihalides comprises reacting as reactants tin metal and an ethereal solution of a hydrogen halide to form trihalostannous acid etherate, reacting said trihalostannous acid etherate and a compound selected from the group consisting of α-unsaturated olefinic and cycloolefinic compounds and recovering said organotin trihalide.

According to another of its aspects, the method of this invention for producing organotin trihalides comprises a first step of preparing trihalostannous acid dietherate by reacting as reactants tin, hydrogen chloride, and an organic ether, a second step of reacting as reactants said trihalostannous acid dietherate produced in said first step and a compound selected from the group consisting of α-unsaturated olefinic compounds and cycloolefinic compounds and recovering said organotin trihalide compounds.

According to another of its aspects, the method of this invention for producing organotin trihalides comprises reacting as reactants in ethereal solution trihalostannous acid, $HSnX_3$, wherein X is halogen, and a compound selected from the group consisting of α-olefinic compounds and cycloolefinic compounds in the presence of a free radical catalyst and recovering said organotin trihalide compounds.

Catalysts operable in the practice of this invention generally include any free radical catalyst. Specific catalysts include alkyl peroxides or hydroperoxides, e.g. di-t-butyl hydroperoxide and hexachloroplatinic acid.

The reaction of trihalostannous acid, $HSnX_3$, may be practiced with α-unsaturated olefins of the formula $H_2C=CH-R'$ in which R' may contain various functional groups. The reactant α-unsaturated olefins operable in the practice of this invention include: ethylene, propylene, butene-1, isobutene-1, pentene-1, hexene-1, heptene-1, and octene-1; substituted olefins such as acrylonitrile and cyclic olefins such as cyclohexene.

In the compound, $RSnX_3$, R is selected from the group consisting of, generally, lower substituted and unsubstituted alkyl and cycloalkyl groups. When R is alkyl it may include ethyl, n-propyl, isobutyl, n-butyl, amyls, octyls, etc. When R is cycloalkyl it may include cyclohexyl, cycloheptyl, etc.

The trichlorostannous acid of this invention may be prepared from either tin metal or anhydrous stannous dichloride in ethyl ether. An etherate of trichlorostannous acid is readily prepared by reacting tin metal with an ethereal solution of hydrochloric acid.

The reactions of this invention may be conducted in the presence of an inert diluent or solvent, e.g. diethyl ether, tetrahydrofuran, tetrahydropyran, 2-methyl-tetra-hydrofuran and 2-ethoxytetrahydropyran. The reactant trihalostannous acid of this invention must be in the form of an etherate. Ethers operable in the practice of this invention include those of the formula ROR', wherein R and R' may be alkyl radicals, either straight chain or branched, including methyl, ethyl, n-propyl, isopropyl, n-butyl, isobutyl, sec-butyl, tert-butyl, n-amyl, isoamyl, n-hexyl, isohexyl, heptyls, octyls, decyls, dodecyls, tetradecyl, octadecyl, etc. Cyclic ethers such as tetrahydropyran, tetrahydrofuran, 2-methyl-tetrahydrofuran, tetrahydrofurfuryl ethyl ether, and dihydropyran are also operable in forming etherates with trihalostannous acid.

More specifically the practice of this invention may be effected by charging tin foil or stannous halide to a reaction flask, bubbling hydrogen chloride into the reaction flask, thereafter bubbling an unsaturated olefin or a cycloolefinic compound into a reaction flask adding alcohol, and thereafter separating the organotin trihalide compound. An α-unsaturated olefin or a cycloolefinic compound may be bubbled into a reaction vessel or trap containing suitable catalysts and the vessel may be, preferably, immersed in an ice bath.

The reaction may proceed as follows, e.g. di-tert-butyl peroxide is added to a reaction vessel in an ice bath. The vessel is cooled to approximately 5°C. Trichlorostannous acid, $HSnX_3$, is then added followed by the addition of an unsaturated organic compound. After removing the reaction mixture from the ice bath, the temperature is allowed to rise to room temperature. The reaction mass may be filtered to separate the product from the catalyst.

Solvents or diluents suitable as the reaction medium of this invention include aliphatic hydrocarbons, aromatic hydrocarbons and ethers. The foregoing may contain carboxylic esters, carboxylic amides, and nitrile groups as substituents. Among the suitable solvents are diethyl ether and tetrahydrofuran.

The organotin trihalide compounds of this invention are active in the control of a wide variety of pestiferous organisms, particularly bacteria, fungi, and marine organisms, e.g. as the active component—antifouling paints. The compounds of this invention are particularly adapted to inhibiting microbiological deterioration of organotin substances, particularly susceptible to deterioration by the action of micro-organisms. The compounds are also active in inhibiting the formation of slime in aqueous fluids.

Practice of this invention may be observed from the following illustrative examples which are not to be construed as limiting the broader aspects of the invention.

EXAMPLE 1

Preparation of Isopropyltin Trichloride 23.8 grams (0.2 mole) of tin foil was charged to 300 milliliters of anhydrous ethyl ether contained in a 500 milliliter three-necked flask, equipped with an air motor and stirrer, a nitrogen gas inlet tube, a hydrogen chloride gas dip tube, a water condenser topped with a drying tube, and a Y-type adapter. A nitrogen atmosphere was maintained throughout the reaction. 21.9 grams (0.6 mole) of hydrogen chloride was slowly bubbled through the ether solvent, during which time a temperature of 10° C. was maintained by means of an ice bath. The hydrogen chloride was added during a 2.5 hour increment. The reaction was allowed to proceed for 17 hours, after which time the reaction mass was cooled by means of an ice water bath and 9.4 grams (0.22 mole) of propylene were bubbled through the mixture for 3 hours. 10 milliliters of anhydrous ethyl alcohol were added. The reaction mixture was filtered. The filtrate was distilled to obtain 4.2 grams of isopropyltin trichloride, a yield of 7.9 percent exhibiting a boiling point range of 48° C. to 50° C., 0.7–0.8 millimeters of mercury, and an index of refraction of 1.5280.

EXAMPLE 2

Preparation of Cyclohexyltin Trichloride

The procedure of example 1 was followed except that the reactor was charged with 17.0 grams (0.21 mole) of cyclohexene instead of propylene. The product cyclohexyltin trichloride exhibited a weight of 1.9 grams and a melting point range of 27° C. to 28° C.

EXAMPLE 3

Preparation of Sec-butyltin Trichloride

The procedure of example 1 was followed except that 11.4 grams (0.2 mole) of 1-butene was used instead of propylene. In addition a catalyst combination of 90 milliliters of a hydrocarbon solution containing 6 percent cobalt naphthenate and 150 milliliters of tertiary butyl hydrogen peroxide were added. The identification of the product was confirmed by vapor phase chromatographic analyses to be 97.6 percent of sec-butyltin trichloride, exhibiting an index of refraction of 1.5042.

We claim:

1. A method for the production of organotin trihalides comprising reacting as reactants tin metal and an ethereal solution of stannous halide to form trihalostannous acid etherate, reacting said trihalostannous acid etherate and a compound selected from the group consisting of ethylene, propylene, butene-1, isobutene-1, penetene-1, hexene-1, heptene-1, octene-1, cycloheptene and cyclohexene, and recovering said organotin trihalide compounds.

2. A method for producing organotin trihalides comprising a first step of preparing trihalostannous acid dietherate by reacting as reactants tin, hydrogen chloride, and an organic ether, a second step of reacting as reactants said trihalostannous acid dietherate produced in said first step and a compound selected from the group consisting of ethylene, propylene, butene-1, isobutene-1, pentene-1, hexene-1, heptene-1, octene-1, cycloheptene and cyclohexene, and recovering said organotin trihalide compounds.

3. A method for producing organotin trihalides, the steps which comprise disposing in a reaction zone trihalostannous acid $HSnX_3$, wherein X is halogen in an ethereal solution and a member selected from the group consisting of ethylene, propylene, butene-1, isobutene-1, pentene-1, hexene-1, heptene-1, octene-1, cycloheptene and cyclohexene, reacting said trihalostannous acid and said member, and recovering organotin trihalide from said reaction zone.

4. A method as recited in claim 3 in which X is chlorine.

5. A method as recited in claim 4 in which said member is 1-butene.

6. A method for producing organotin trihalides, the steps which comprise disposing in a reaction zone trihalostannous acid $HSnX_3$, wherein X is halogen in an ethereal solution and a member selected from the group consisting of ethylene, propylene, butene-1, isobutene-1, pentene-1, hexene-1, heptene-1, octene-1, cycloheptene and cyclohexene, reacting said trihalostannous acid and said member in the presence of a free radical catalyst, and recovering organotin trihalide from said reaction zone.

7. A method as recited in claim 6 in which X is chlorine.

8. A method as recited in claim 7 in which said member is 1-butene.